United States Patent Office 3,361,651
Patented Jan. 2, 1968

3,361,651
ELECTROLYTIC REDUCTION OF URANYL SOLUTIONS
Norman Parkinson, Thurso, John Alistair Stevenson Mowat, Castletown, and Moira Baillie Finlayson, Thurso, Scotland, assignors to United Kingdom Atomic Energy Authority, London, England
Filed Jan. 12, 1966, Ser. No. 520,115
Claims priority, application Great Britain, Jan. 22, 1965, 2,884/65
7 Claims. (Cl. 204—1.5)

ABSTRACT OF THE DISCLOSURE

A method of hydrolytic reduction for solutions either having uranyl ion components where the valency of the component is to be reduced or having uranyl ion and plutonium ion components where the valency of either or both of these components is to be reduced. The method utilizes an electrolytic cell or series of cells having a tantalum cathode.

---

Figure 1:
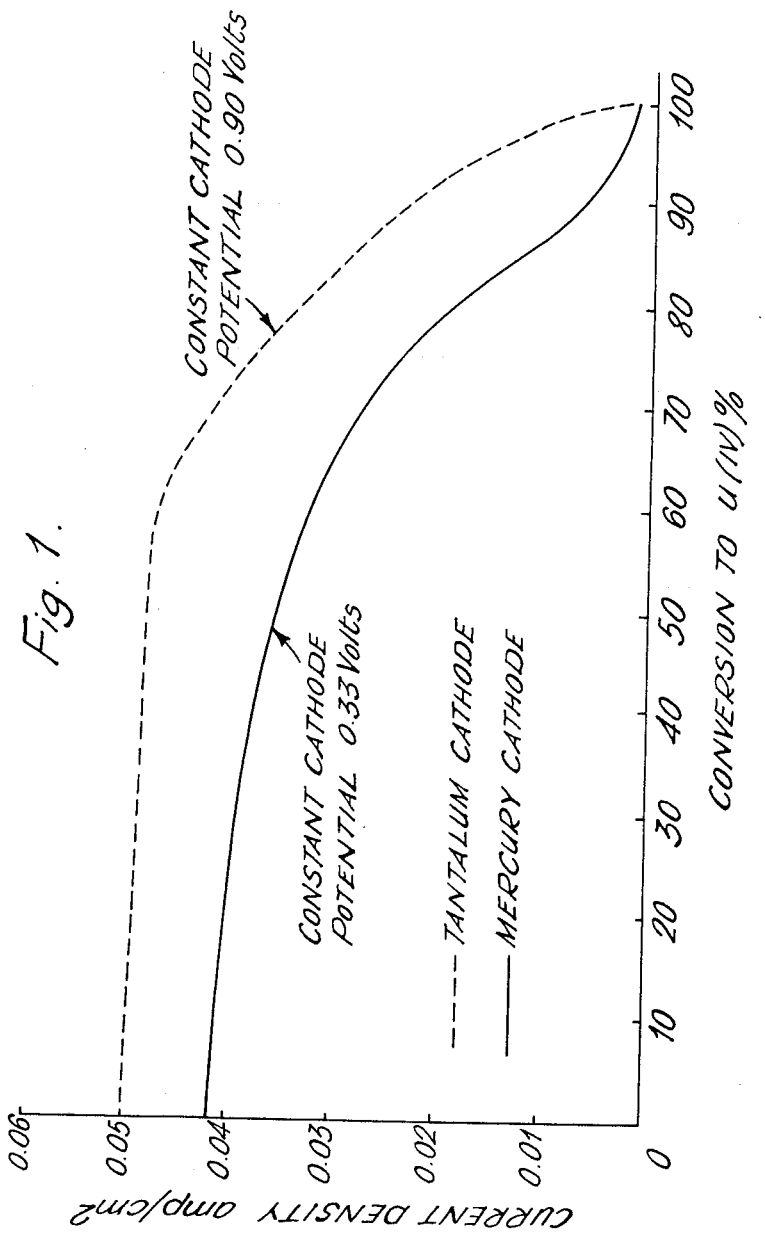

This invention relates to the treatment and production of nuclear fuel materials for use in nuclear reactors, and is primarily though not exclusively directed to the production of uranium oxides and mixtures of uranium and plutonium oxides.

One known method for the production of uranium oxides involves the precipitation of ammonium diuranate (A.D.U.) by the addition of ammonia to an aqueous solution containing U (VI) ions, such customarily being in the form of uranyl nitrate in nitric acid. The A.D.U. precipitate is calcined (to $UO_3$) and, if so required, the calcined precipitate can be reduced to give uranium dioxide which can then be sintered to high density. Mixtures of uranium and plutonium oxides can be prepared by precipitating a mixture of A.D.U. and plutonium (IV) hydroxide by the addition of ammonia to an aqueous solution containing uranyl irons and plutonium (IV) ions, calcining the precipitate and, if required, reducing the calcined precipitate to a uranium/plutonium dioxide.

An alternative method, which offers the advantage of ease of filtration after precipitation, is that disclosed in our U.K. patent specification No. 978,615, namely a method of producing a mixture of uranium and plutonium oxides, which comprises precipitating a mixture of the oxalates of uranium (IV) and plutonium (III) from a solution containing the metal ions and calcining such oxalate precipitate.

The stipulation in patent specification No. 978,615 that the uranium in the uranium oxalate precipitate should be in the tetravalent state is because of the comparatively high solubility of uranyl oxalate, and accordingly there is considerable interest in the development of improved methods for the reduction to the tetravalent state—that is to say U (IV)—of uranium compounds in which the uranium is initially in its readily available hexavalent—U (VI)—form.

The present invention resides in a method of treating nuclear fuel material, wherein a solution containing uranium or a mixture of uranium and plutonium is subjected to electrolytic reduction, employing a tantalum cathode, to change the valency state of the uranium in the case of a solution containing uranium or the valency state of at least one of the constituents in the case of a solution containing a mixture of uranium and plutonium.

The production of uranium oxide includes the step in accordance with the present invention of preparing a solution containing (IV) ions by electrolytic reduction, employing a tantalum cathode, of a solution containing uranyl ions. From the solution containing uranium (IV) ions so prepared, the oxalate of uranium (IV) can be precipitated and subsequently calcined. If the solution containing uranyl ions also contains plutonium in the tetravalent state, the electrolytic reduction serves to reduce the plutonium to the trivalent state before the uranyl ions are changed to U (IV) ions.

Thus in the case of a solution containing a mixture of uranium and plutonium the treatment of the present invention can be carried out to give a solution containing uranyl ions and plutonium (III) ions or a solution containing uranium (IV) ions and plutonium (III) ions.

The production of a mixture of uranium and plutonium oxides includes the step in accordance with the present invention of preparing a solution containing uranium (IV) ions and plutonium (III) ions by electrolytic reduction employing a tantalum cathode of a solution containing uranyl ions and plutonium (IV) ions. From the solution containing uranium (IV) ions and plutonium (III) ions so prepared, a mixture of the oxalates of uranium (IV) and plutonium (III) can be precipitated and subsequently calcined.

Also according to the present invention, apparatus for effecting the method of any one of the four preceding paragraphs comprises a number of electrolytic cells each having a tantalum cathode, the cells being connected in series for flow of solution and in parallel for passage of current.

The invention includes within its scope nuclear fuel material treated by the method or in the apparatus disclosed in the five preceding paragraphs.

The above mentioned patent specification gives examples of the electrolytic reduction of solutions containing uranyl nitrate and nitric acid, or uranyl nitrate, plutonium nitrate and nitric acid, using a mercury cathode. This is to be contrasted with the method of the present invention which provides for the use of a tantalum cathode, and thus affords in general terms the advantages of employing a solid (tantalum) cathode as compared with a liquid (mercury) cathode. In the particular context, not only does this facilitate electrolytic cell construction and make possible the use of more compact cells particularly for continuous operation, but also assists in making available a larger surface area. The importance of this latter consideration can be appreciated by noting that in the examples described in the above mentioned patent specification it was considered desirable to provide for stirring.

Figure 2:
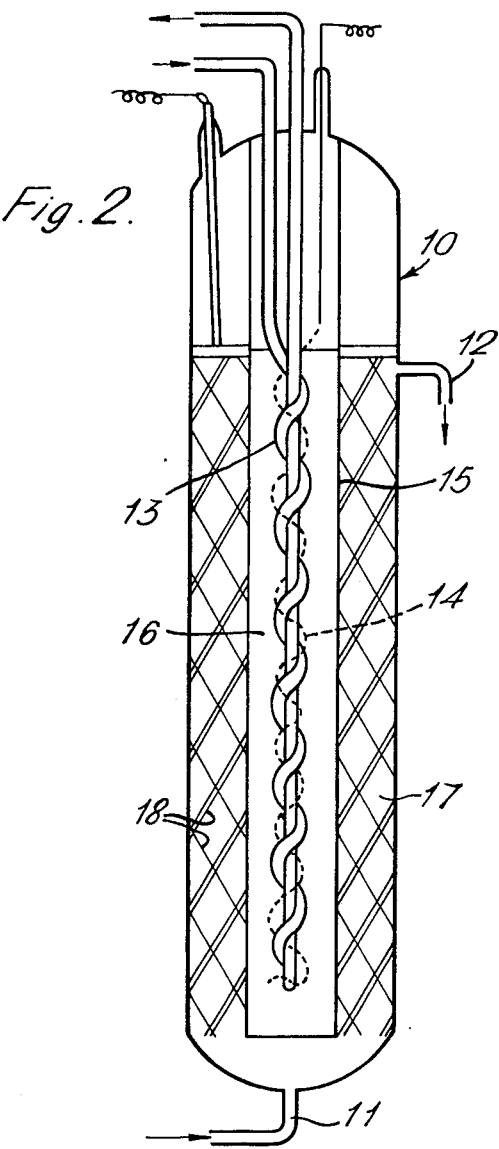

Various examples of the invention are described below with reference to the accompanying drawings in which:
FIGURE 1 is a graph, and
FIGURE 2 is a schematic sectional view of an electrolytic cell.

In the first example an electrolytic cell was constructed with a platinum anode in an anode compartment separated from a surrounding cathode compartment by a porous barrier. In the cathode compartment a tube of tantalum served as the cathode. With the anode compartment containing 1 M nitric acid, a solution of 0.5 M uranyl nitrate, 1 M in nitric acid, was introduced into the cathode compartment for electrolysis. Current efficiencies for cathodic reduction of the uranyl ions over a range of current densities were determined by placing a copper coulometer in series with the cell and weighing the coulometer cathode after electrolysis, whilst the extent of electrolysis at any time was estimated by titrating a 5 ml. sample with potassium dichromate, using barium diphenylamine sulphonate as an external indicator. Towards completion of the reduction an alternative method of analysis was used, namely precipitation of the U (IV) as oxalate and determination of the U (VI) present in the filtrate using a spectrophotometer at 410 mu (millimicron) wavelength.

The results obtained are shown in the following Table I and compared with those of similar experiments using a tubular niobium cathode and a mercury pool cathode, and in the graph of FIGURE 1.

TABLE I.—EFFECT OF CURRENT DENSITY ON CURRENT EFFICIENCY WITH DIFFERENT CATHODE MATERIALS

| Cathode Material | Cathode Potential vs. Saturated Calomel Electrode (volts) | Initial Current (amp) | Current Density (amp/cm.²) | Current efficiency (percent) |
|---|---|---|---|---|
| Tantalum | 0.90 | 8 | 0.05 | 95 |
|  |  | 7 | 0.046 | 90 |
|  |  | 6 | 0.040 | 80 |
|  |  | 5 | 0.033 | 95 |
| Mercury | 0.33 | 5 | 0.040 | 90 |
|  |  | 4 | 0.032 | 96 |
| Niobium | 0.95 | 7 | 0.046 | 50 |
|  |  | 5 | 0.033 | 51 |
|  |  | 3 | 0.020 | 52 |

The results in the Table I show that the cathodic efficiency of uranyl ion reduction at the tantalum cathode was comparable to that at the mercury cathode, but was only 50% with the niobium cathode. As shown in FIGURE 1, the maximum current density that could be achieved without gas evolution was higher for a tantalum cathode than for a mercury cathode at all stages of U (VI) ion reduction, and the constant cathode potentials (vs. Saturated Calomel Electrode) were 0.90 volt and 0.33 volt respectively.

FIGURE 2 shows a glass electrolytic cell 10 (typically 9" long and 2½" in diameter) having at its lower end an inlet 11 and adjacent its upper end an outlet 12. A hollow glass coil 13 mounted coaxially in the cell 10 carries a wrapped platinum wire anode 14. A microporous polyvinyl chloride membrane 15 supported from the cell 10 defines and separates an inner anode compartment 16 housing the anode 14 and an outer annular cathode compartment 17. In the compartment 17 there is a tantalum cathode 18 in the form of entangled tantalum wire presenting a total cathode surface area of some 1,300 cm.². A piece of tantalum sheet metal (not shown) is spot welded to the entangled wire over the length of the cathode 18 to improve electrical contact. Control of the cell temperature can be effected by passage of water through the coil 13. The entangled wire of the tantalum cathode 18 may be replaced by a tantalum gauze or a tantalum sheet.

Seven of the cells 10 were connected in series for liquid flow and in parallel for passage of current so as to obtain current densities decreasing from one cell in the series to the next in the direction of liquid flow in order to maintain current efficiency.

With 1 M nitric acid in the anode compartments 16, a solution of 0.5 M uranyl nitrate, 1 M in nitric acid, was pumped at a typical flow rate of 1 litre/hour into the compartment 17 of the first cell by way of the inlet 11 to flow upwards over the cathode 18 to undergo electrolytic reduction, then to the outlet 12 and thence to the inlet 11 of the next cell and so on in a continuous manner. Results obtained in this second example are given in the following Table II.

TABLE II

| Cell Number | 1 | 2 | 3 | 4 | 5 | 6 | 7 |
|---|---|---|---|---|---|---|---|
| Conversion to U(IV), Percent | 32 | 64 | 76 | 88 | 94 | 99 | 99.8 |
| Overall current, amp | 9 | 9 | 5 | 5 | 3 | 3 | 2 |
| Current efficiency, Percent | 96 | 96 | 64 | 64 | 54 | 48 | 13 |
| Cell temperature, °C | 45 | 56 | 66 | 55 | 45 | 60 | 60 |

In a manner known in itself, urea was added to the solution before electrolysis so that the cathode efficiency for the reduction of U (VI) to U (IV) ions was kept as high as possible. Temperatures in the first five cells were maintained by heat generated during electrolysis, and in the sixth and seventh cells heat was supplied by auxiliary electrical windings, external to those cells.

A problem encountered in the electrolytic reduction of uranyl nitrate/nitric acid solutions is that of evolution of gas, possibly hydrogen and/or nitrogen oxides, at the cathode. Thus after eight litres of the solution used in the second example had been passed through the series of cells, it was noted that gas was evolved at the tantalum cathode in the first cell at progressively lower current densities. The solution used contained impurities (mainly Al, Ca, Fe, Cr, Cu, Ni and Mg, total impurity content 570 p.p.m.) and in an attempt to obtain further information concerning this problem a quantity of 1000 p.p.m. of one of each of the impurity elements was added separately (as nitrate) to purified solutions of the same uranyl nitrate and nitric acid concentration as the impure solution previously used. Each solution containing a single impurity was then subjected to electrolytic reduction in a cell incorporating a tantalum cathode. In no case did a decrease in hydrogen overpotential occur, but for the solution containing 1000 p.p.m. Fe it was unexpectedly found that the current density on the tantalum cathode could be increased threefold (as compared with the normal maximum current density—0.05 amp./cm.²) before there was any sign of gas evolution. The iron content of the solution leaving the cell was 560 p.p.m.

In a third example, a solution containing a mixture of uranyl nitrate, plutonium (IV) nitrate and nitric acid having a total metal concentration of 150 g./litres (15–Pu/85–U) was electrolysed in a cell as used in the first example. The current density was adjusted to maintain a constant cathode potential of 0.9 v., virtually complete reduction of the plutonium to the trivalent state and 99.8% reducion of uranium to the tetravalent state being obtained. The overall current efficiency was 95%.

During the course of this example it was observed from the results of periodic analysis of samples that no significant change of the uranyl ion concentration took place until virtually complete reduction of the plutonium (IV) to plutonium (III) ions had taken place. In other words the electrolytic reduction gave an intermediate solution containing uranyl ions and plutonium (III) ions.

Such a solution can be processed to separate the uranyl ions from the plutonium (III) ions. In this context the reduction is controlled to avoid the formation of any significant amount of uranium (IV) ions whilst giving substantially complete reduction of plutonium (IV) ions to plutonium (III) ions. This has application in the reprocessing of nuclear fuels after irradiation, for example by solvent extraction, to separate uranium and plutonium fuel materials.

In conventional solvent extraction processes where the plutonium content of the irradiated fuels is low, i.e. 0.1 to 1.5% plutonium (as is the case for fuels from many thermal reactors), ferrous sulphamate is used to give trivalent plutonium whilst avoiding the formation of tetravalent uranium, but the aqueous product containing the plutonium usually requires purification to remove or reduce the iron concentration.

More highly enriched fuels, containing 10–30% plutonium for example, present the same problem to a greater degree, and it is also difficult to maintain a sufficiently high ferrous/ferric ratio to ensure efficient uranium/plutonium separation in such conventional solvent extraction processes.

The controlled electrolysis reduction discussed above is advantageous in that it avoids the need for the deliberate addition of other metal ions.

We claim:

1. A method of treating nuclear fuel material comprising the steps of subjecting a solution of uranyl ions to electrolytic reduction in a cell with a porous membrane dividing the cell into cathode and anode compartments by employing a tantalum cathode in the cathode compartment to change the valency state of the uranyl ions in the solution.

2. A method of treating nuclear fuel material according to claim 1 applied to a solution of uranyl ions which additionally contain plutonium ions, the step of electrolytic reduction serving to change the valency state of at least one of the constituent ions in the group consisting of uranyl ions and plutonium ions contained in the solution.

3. A method as claimed in claim 1, wherein the solution contains uranyl ions and the electrolytic reduction is conducted to yield a solution containing uranium (IV) ions.

4. A method as claimed in claim 1 wherein said solution is subjected to electrolytic reduction by flowing successively through a plurality of electrolytic cells each having a porous membrane dividing the cell into cathode and anode compartments and, by employing a tantalum cathode in each cathode compartment of said cells, said cells being electrically connected in parallel.

5. A method as claimed in claim 2, wherein the solution contains uranyl ions and plutonium (IV) ions, and the electrolytic reduction is conducted to yield a solution containing uranyl ions and plutonium (III) ions.

6. A method as claimed in claim 2, wherein the solution contains uranyl ions and plutonium (IV) ions, and the electrolytic reduction is conducted to yield a solution containing uranium (IV) ions and plutonium (III) ions.

7. A method as claimed in claim 4 wherein at least one of said tantalum cathodes is in the form of entangled wire.

References Cited

UNITED STATES PATENTS 2,832,728   4/1958   Kunin _____ 204—1.5

FOREIGN PATENTS 978,615   12/1964   Great Britain.

OTHER REFERENCES

Freyberger, W., U.S. Atomic Energy Commission, A.E.C.D. 4101 Electrolytic Reduction of Uranyl and Ferric Sulfate Solutions, May 12, 1950, pp. 1 and 2.

REUBEN EPSTEIN, *Primary Examiner.*